Oct. 20, 1959 G. W. ONKSEN ET AL 2,909,724
TESTING AND CALIBRATING APPARATUS
Filed Nov. 10, 1953 3 Sheets-Sheet 1

INVENTORS
George W. Onksen,
Robert N. Falge &
BY Howard C. Mead
ATTORNEY

Oct. 20, 1959 G. W. ONKSEN ET AL 2,909,724
TESTING AND CALIBRATING APPARATUS
Filed Nov. 10, 1953 3 Sheets-Sheet 2

INVENTORS
George W. Onksen,
Robert N. Faige &
BY Howard C. Mead
ATTORNEY

Oct. 20, 1959 G. W. ONKSEN ET AL 2,909,724
TESTING AND CALIBRATING APPARATUS
Filed Nov. 10, 1953 3 Sheets-Sheet 3

INVENTORS
George W. Onksen,
Robert N. Falge &
BY Howard C. Mead
ATTORNEYS

United States Patent Office 2,909,724
Patented Oct. 20, 1959

2,909,724

TESTING AND CALIBRATING APPARATUS

George W. Onksen, Robert N. Falge, and Howard C. Mead, Anderson, Ind., assignors to General Motors Corporation, Detroit, Mich., a corporation of Delaware Application November 10, 1953, Serial No. 391,186

9 Claims. (Cl. 324—24)

This invention relates to a testing and calibrating apparatus for an automatic headlamp dimmer and like light-sensitive devices utilizing a photosensitive element.

Automatic headlamp dimmers generally employ a photosensitive element which is responsive to the light intensity of oncoming vehicles in such manner as to automatically switch the vehicle headlamps to low beam when the oncoming vehicle is at a predetermined distance and to high beam when the oncoming vehicle has passed. The dimmer circuit provides some means for maintaining the headlamps on low beam once dimmed in response to the illumination from the oncoming vehicle thereby avoiding flashing in the instance where the oncoming headlight beam was high and was switched to low beam.

Such hold action is generally accomplished (1) by providing within the circuit a suitable time delay that prevents restoration to high beam for a predetermined interval, and (2) by providing within the circuit means for maintaining the headlamps in low beam condition under the action of the decreased intensity level from the approaching vehicle, once the headlamps are initially dimmed by the automatic action of the circuit. With the first type of holding means an initial threshold light intensity is required to actuate the circuit and dim the lights, the lights being restored to bright condition upon elapse of the predetermined time interval. With the second type of holding means, a first threshold light intensity is required to cause dimming and a second threshold light intensity, lower than the first-mentioned value, is required to return the lights to high beam condition. In either case, the device must be calibrated to dim in response to a predetermined light intensity at a predetermined distance, and, where the holding means is of the second-mentioned type, must also be calibrated so that it functions to retain the headlamps in dimmed condition until the oncoming light falls below the lower threshold.

In order to test and properly calibrate the dimmer it is desirable to provide a variable intensity test light which substantially duplicates the lighting from oncoming vehicles. At the same time, it is desirable that the testing and calibrating apparatus be compact and simple to operate and capable of being mounted on the light pickup unit without having to disassemble any part of the unit.

Accordingly, it is an object of our invention to provide an apparatus for testing and calibrating an automatic headlamp dimmer for assuring the proper function of the dimmer under normal operating conditions.

It is another object of our invention to provide a testing and calibrating apparatus which substantially duplicates the lighting conditions encountered by the dimmer under normal operating conditions.

It is another object of our invention to provide a testing and calibrating apparatus which substantially duplicates the lighting conditions encountered by the light pickup unit under normal operating conditions.

It is another object of our invention to provide a testing and calibrating apparatus for use with automatic headlamp dimmers which is compact and simple to install and operate.

It is another object of our invention to provide an optical unit capable of simulating the lighting conditions encountered by the light-sensitive device.

It is another object of our invention to provide an apparatus for mounting the optical unit accurately on the front face of the light-sensitive device.

It is another object of our invention to provide a method for testing and calibrating an automatic headlamp dimmer.

To attain these objects we provide a testing head having a variable light source therein and means for controlling the optical characteristics of the light projected therefrom, the testing head being adapted to be mounted in the desired position at the front of the light pickup unit.

Further objects and advantages of the present invention will be apparent from the following description, reference being had to the accompanying drawings, wherein one form of the present invention is clearly shown.

Figure 1:
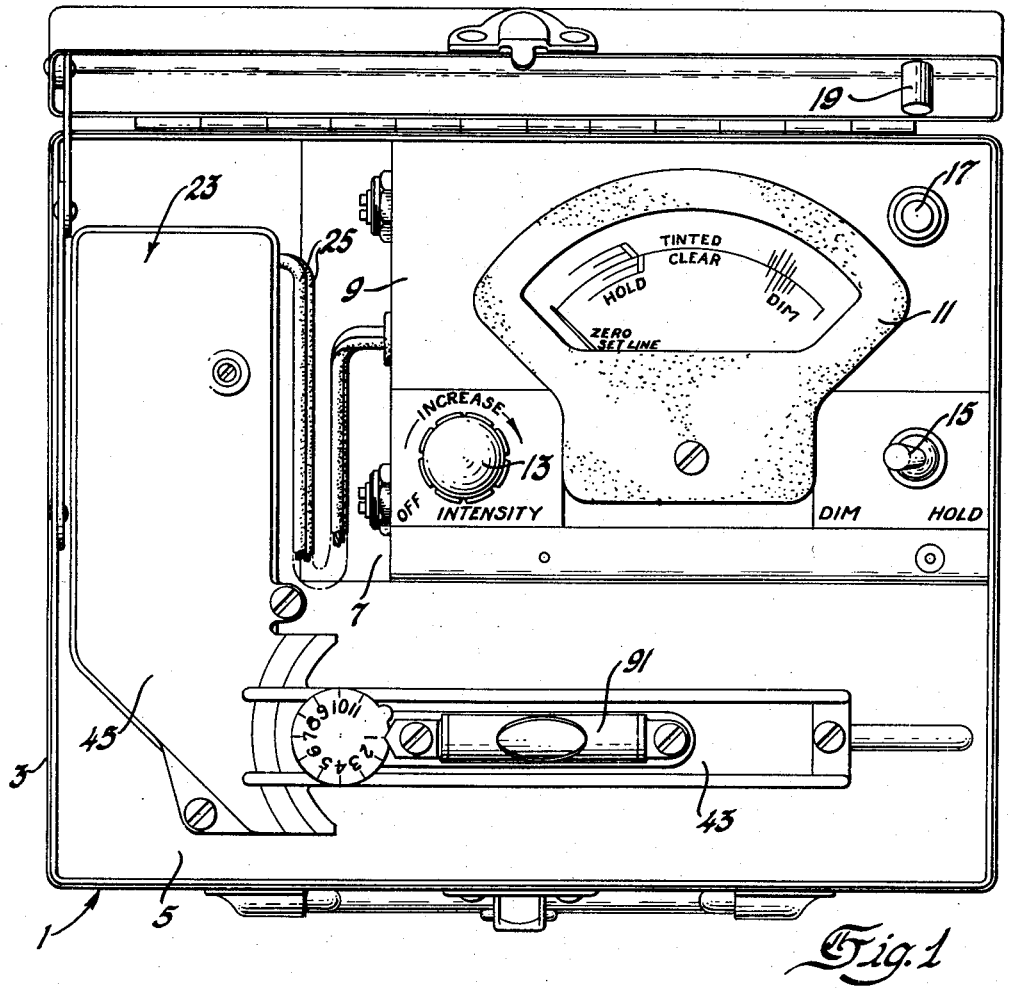
Figure 1 is a top view of the testing and calibrating apparatus of our invention.

Referring now to the drawings, Figure 1 shows a top view of the testing and calibrating apparatus 1 including a suitable carrying case 3. The case 3 is designed in two major sections, a padded section 5 for receiving a tester head and a calibrating section 7 containing the electrical circuit and component parts thereof. The control panel 9 has positioned thereon a sensitivity meter 11 suitably calibrated to indicate light intensity, a light intensity rheostat control knob 13, a meter range selector toggle 15 and a battery switch interlock plunger 17. Plunger 17 is operated by a stud 19 located on the case cover in such position as to coact therewith. The function and operation of these controls will be described in detail hereinafter.

Electrical energy for the apparatus is provided by means of a battery 21 located in the calibrating section 7. It should be understood, however, that the energy may be derived from any suitable source, i.e., the vehicle battery, the necessary and well-known means for stepping down the voltage to the desired value for which the tester has been designed being incorporated. A pair of cables 25 connect the tester head 23 to the control circuit. The tester 23 is so constructed as to be mounted on the light pickup unit and is adapted to substantially duplicate the lighting conditions encountered in normal use on the road.

Figure 2:
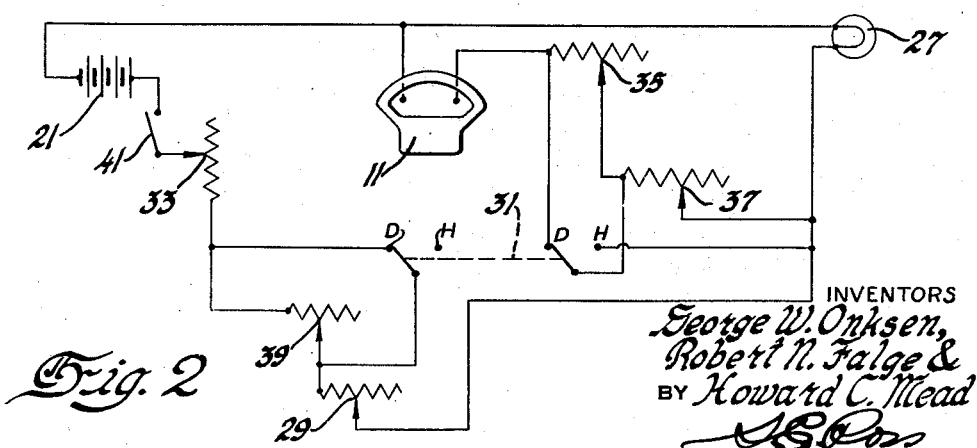
Figure 2 is a schematic diagram of the electrical circuit used with the apparatus of our invention.

The schematic for the electrical circuit used with the apparatus of our invention is shown in Figure 2 and includes, in addition to battery 21 and meter 11, a test bulb 27, a test bulb intensity rheostat 29, meter range selector switch 31, battery adjusting rheostat 33, hold adjusting rheostat 35, dim adjusting rheostat 37, hold adjusting rheostat 39 and interlock switch 41 which is operative to break the battery circuit on closing the lid of the carrying case 3.

As shown in Figure 2, the selector switch 31 has two sets of contacts, each set comprising a dim and a hold contact, designated as D and H, respectively, one set of contacts is located in the meter circuit which is wired as a branch circuit in parallel with the test bulb 27. The meter circuit comprises the meter 11 arranged in series with hold rheostat 35 and dim rheostat 37. Meter circuit contacts D and H are so arranged that when selector switch 31 is put in the dim position, hold rheostat 35 is shunted out of the circuit and when put in the hold position, dim rheostat 37 is shunted out of the circuit. Rheostats 35 and 37 are of the 5,000 ohm type.

The other set of contacts is located in the test bulb circuit and comprises the bulb 27 in series with the intensity rheostat 29, hold rheostat 39, having a value of 10 ohms, battery adjusting rheostat 33, interlock switch 41 and battery 21. Bulb circuit contacts D and H are so arranged that when selector switch 31 is put in the dim position, hold rheostat 39 is shunted out of the circuit. Contact H is a dummy contact and rheostats 29 and 39 remain in the circuit when switch 31 is thrown to the hold position, the range of light intensity of bulb 27 being less in this position than when switch 31 is in the dim position. In the circuit shown, the range is reduced to $\frac{1}{10}$ the range for dim position.

Switch 31 is of the double pole, double throw type and and the H and D contacts of each set are thrown in and out of their respective circuits simultaneously. It should be noted that, as indicated above, the intensity of bulb 27 is controlled both by intensity rheostat 29 and by range selector switch 31 which acts to put rheostat 39 in and out of the bulb circuit.

Resistors 33, 35, 37 and 39 are made adjustable so that the meter can be calibrated during manufacture of the apparatus and so that the tester may be recalibrated as desired. The operation of the circuit in calibrating an automatic headlamp dimmer will be understood from the description thereof given hereinafter.

Figure 3:
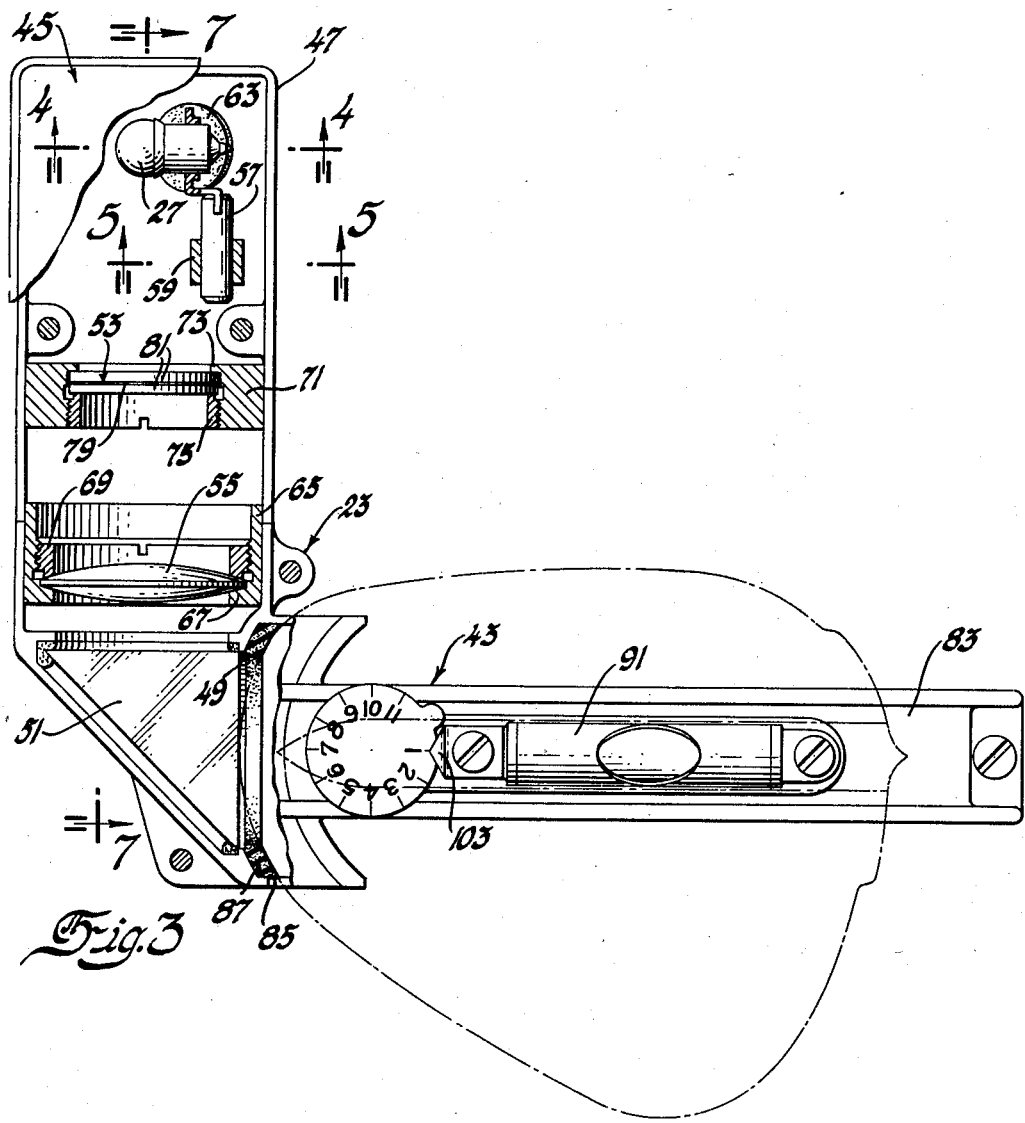
Figure 3 is a top view with parts broken away of the tester and mounting bracket formed integral therewith.

In the embodiment shown and described herein, the tester 23 is particularly adapted for use in conjunction with the light pickup unit of the "Autronic-Eye." As shown in Figures 1 and 3, tester 23 is made up of two major components, the mounting and leveling section 43 and the optical section 45. Optical section 45 comprises a housing 47 having an opening 49 on the side at one end thereof and a light source, bulb 27, adjustably mounted in the other end. Since the pickup unit, shown ghosted-in in Figures 3 and 6, mounts close to the windshield, the tester 23 is so designed that the optical axis of the lamp section 45, taken between bulb 27 and reflector 51, is at an angle to the optical axis of the pickup unit and to the longitudinal axis of the mounting section 43, which latter two axes are shown to be parallel. The light reflecting element 51 is positioned adjacent the opening 49 in order to bend the light rays from bulb 27 through the angle necessary to pass them into the condensing lens of the pickup unit. In this manner the tester 23 is capable of being mounted on the front end of the pickup unit despite the limited clearance between the unit and the windshield. It is to be understood that while we show a reflecting prism in Figure 3 for bending the light rays, we may obtain the same results with any other suitable device such as a simple mirror. Likewise, the opening 49 may be of any desired configuration, most conveniently circular.

Positioned between the light source 27 and the aperture 49 are a neutral filter 53 and a condensing lens 55. The filter 53 is adjacent the bulb 27 and the lens 55 is adjacent the reflecting element 51. The lens and filter cooperate with the bulb 27 in a manner more fully set forth hereinafter to substantially reproduce the lighting conditions encountered on the road. It should be understood that though we show the lens 55 positioned between the filter 53 and the reflector 51, it may be located with equal effectiveness between the reflector 51 and the opening 49.

Figure 4:
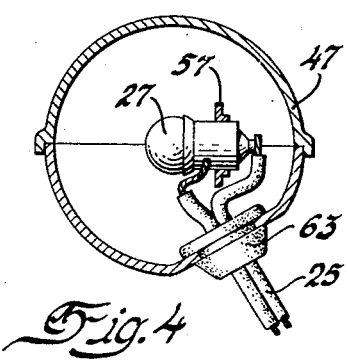
Figure 4 is a sectional view of the tester taken on line 4—4 of Figure 3.
Figure 5:
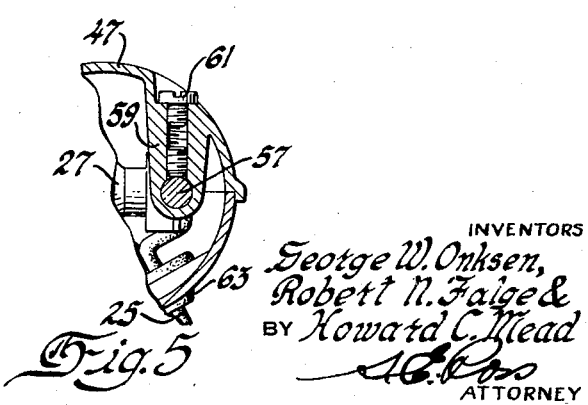
Figure 5 is a sectional view of the tester taken on line 5—5 of Figure 3.
Figure 7:
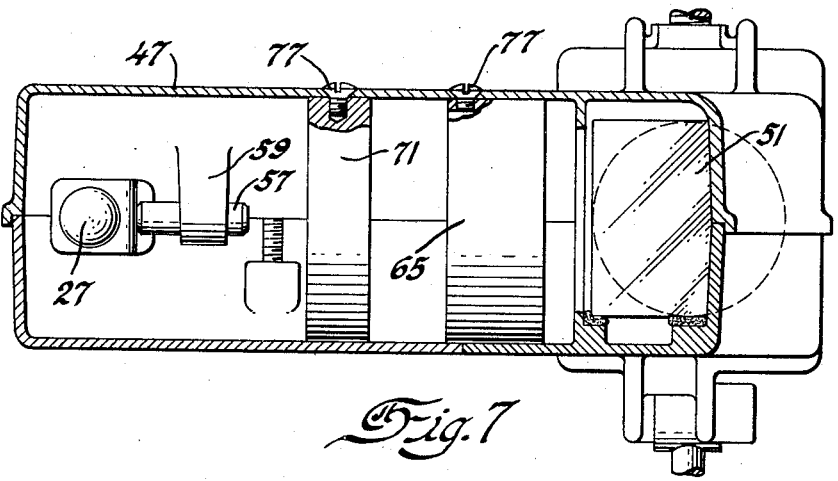
Figure 7 is a side view of the tester taken on line 7—7 of Figure 3.

As shown in Figures 3, 4 and 5, the bulb 27 is secured to an aiming arm 57 with its light filaments in offset relationship to the longitudinal axis of the arm. Arm 57, its longitudinal axis extending in generally the same direction as that of section 45, is adjustably secured by means of a clamping member such as set screw 61 to a supporting stud 59 formed as an integral part of and projecting laterally into housing 47. In this manner, bulb 27 may be adjusted longitudinally within the housing by sliding arm 57 relative to stud 59 to space the filaments from the lens 55 a distance substantially equal to the focal length of the lens thus resulting in substantially parallel light rays for projection into the pickup unit. Likewise, the bulb 27 may be adjusted laterally by rotating arm 57 relative to stud 59 to project the parallel light rays straight into the pickup unit. As shown in Figures 3 and 5, support arm 57 is circular in cross section and is supported in a complementary bore in stud 59. A rubber grommet 63 is positioned in an opening adjacent bulb 27 in order to assure a light-proof passage for the cables 25 connecting the bulb with a source of electrical energy. It should be noted that the housing 47 is formed in removable sections in order to provide easy access to the interior thereof. Lens 55 is supported within housing 47 in any suitable manner, shown in Figures 3 and 7 as comprising a ring holder 65 having an inwardly extending flange 67 formed at one end thereof. A retaining plug 69 threads into the ring and acts to clamp the lens therebetween. Similar means 71, 73 and 75 are used to support filter 53. Holders 65 and 71 are located within the housing by means of fastening members 77.

We prefer to use as a neutral filter element a piece of exposed photographic film 79 pressed between two clear glass plates 81. Such a filter is advantageous not only because of its ability to duplicate light conditions as they occur on the road, but also because the photographic film can be calibrated, by regulating its time of exposure, to the lighting characteristics of the particular test bulb used. In this manner, the amount of light originating from the filter can be precisely fixed. It will be noted that while the light from the test lamp originates with the bulb 27, the source of light insofar as the opening 49 is concerned, is the filter 53.

We prefer to use a one-candle power light bulb as the light source 27. Since the dimmer unit operates with a hold to dim threshold light intensity ratio of 1 to 10, the bulb 27 must operate effectively at $\frac{1}{10}$ its rated candle power for the hold position. This decrease in light intensity of bulb 27 is accomplished by suitable adjustment of rheostat 39, which, as explained above, is in series with the bulb when switch 31 is put in the hold position and is shunted out of the circuit when switch 31 is in the dim position. It has been found that a one-candle power bulb is satisfactory and has a long life when it is operated at a voltage which produces approximately the same color temperature in the dim position as that experienced in actual road conditions. The color temperature in the hold position is below that experienced in road conditions but is sufficiently close for making adjustments. A candle power rating slightly more or less than the preferred candle power may be compensated for in the filter as described above.

As shown in Figures 1 and 3, tester head 23 has integrally formed therewith means 43 for mounting and leveling the optical section 45 on the front of the pickup unit in a predetermined manner. However, it is to be understood that means 43 may be separable from section 45 and that such an assembly is within the scope of our invention. In order to fully simulate normal operating conditions, the mounting and leveling bracket 43 is designed to so position head 23 as to direct the parallel light rays projected from opening 49 straight into the pickup unit. To state this requirement in another manner the accurate location of the tester head 23 on the pickup unit is essential in order to set up a parallel relationship between the rays and the optical axis of the unit.

Figure 6:
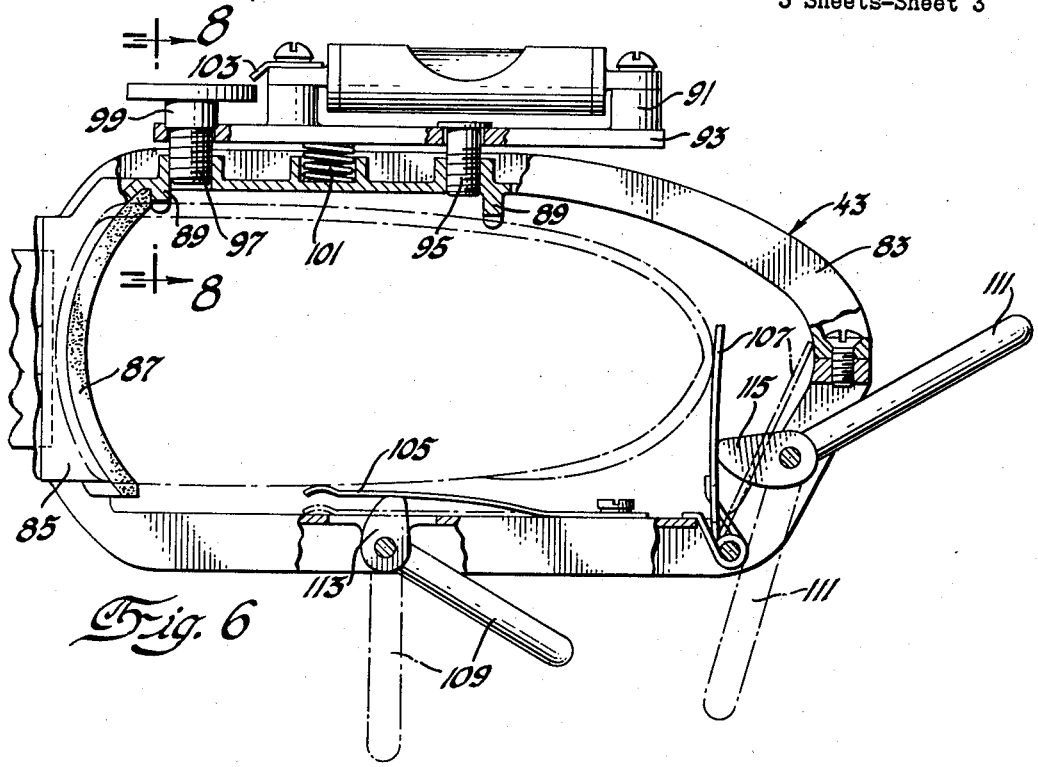
Figure 6 is a side view of the tester mounting bracket.

As is clearly shown in Figure 6, bracket 43 comprises a frame 83 adapted to seat about the pickup unit, the frame having a head portion 85 formed at its front end about opening 49, portion 85 being complementary with the front face of the pickup unit. An annular resilient sealing gasket 87 is secured to the surface of head 85 in order to assure a light-proof connection between the tester 23 and the pickup unit. Gasket 87 may be formed of such materials as foam rubber, velvet, felt, etc. and is preferably black for light absorption purposes.

Figure 8:
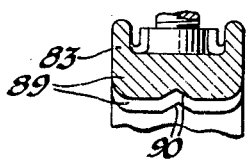
Figure 8 is a sectional view with parts broken away of the upper mounting bracket bar taken on line 8—8 of Figure 6.

Special provision is made on the mounting bracket 83 for its proper location on the face of the pickup unit. A plurality of locating elements 89, shown in Figures 6 and 8 as ribs having notches 90 formed on their lower edge, are provided on the underside of the upper portion of frame 83. These locating elements enable the alignment in a horizontal plane of the optical axis of the pickup unit so as to be in parallel relationship with the light rays projected through opening 49 of the tester 23. This is accomplished by forming a longitudinal ridge on the top for the pickup casing for cooperation with the notches 90 formed in ribs 89. The engagement of the notches 90 with the ridge on top of the pickup casing also provides alignment in a vertical plane of the optical axis of the pickup unit so as to be in parallel relationship with the light ray. A level 91 is secured to the upper surface of the frame 83 and functions to permit vertical aiming of the pickup unit on the vehicle.

In order to compensate for a small amount of axial error in the pickup unit, base plate 93 of the level is tiltably attached to the frame 83 by means of pivot bolt 95, the bolt hole in the plate being larger than the shank of the bolt to permit free rocking movement therebetween and smaller than the head of the bolt which then functions as a stop. An adjusting bolt 97 is provided in one end of the plate 93 and is freely slidable therein. The shank of bolt 97 is threadedly engaged with frame 83 and is provided with a head 99 abutting the upper surface of plate 93. A compression member, compression spring 101, is positioned on frame 83 at a point between bolts 95 and 97 and bearing against plate 93 to urge it into abutment with the bolt heads. By turning bolt 97 either in or out, level 91 is tilted about bolt 95.

The pickup unit is calibrated prior to being put into service to determine the axial error present, this value or equivalent coded number is stamped on the underside of the casing. This error is compensated for when adjusting the vertical aim of the pickup unit on the vehicle by setting its value into the level 91 prior to mounting the tester 23 on the unit. To do this, the head of bolt 97 is calibrated around its circumference with a series of numbers representing the error or its coded equivalent, a pointer 103 being provided on the level as an index point.

Once the tester 23 has been accurately positioned on the pickup, it is clamped in such position by any suitable means. As shown in Figure 6, a pair of spring steel fingers 105 and 107 are secured at one end to frame 83 and are adapted to be urged resiliently into contact with the bottom and back end, respectively, of the pickup casing to clamp the frame 83 thereon. A pair of levers 109 and 111 are pivotally attached to the bottom and back end of frame 83, cams 113 and 115, respectively, being provided on the inner end of each lever for moving the fingers into contact with the pickup casing. The dashed representation of the fingers and levers show their free positions. Upon clamping the tester 23 on the light pickup unit as above described, the operator is in position to proceed with the testing and calibrating of the automatic dimmer circuit. In this connection reference is again made to Figure 1. It will be noted that sensitivity meter 11 is calibrated in such manner as to enable test and calibration of the dimmer circuit in the instance where the windshield of the vehicle is either tinted or clear.

If the windshield of the vehicle behind which the pickup unit is mounted is tinted, the operator limits his reading to the hold and dim calibrations on the upper portion of the meter scale. To start with, the intensity rheostat control knob 13 is turned all the way counterclockwise and toggle 15 is put in the dim position. With the headlamps on high beam, the intensity rheostat control knob is then turned slowly clockwise thus gradually increasing the intensity of the bulb 27 until the headlamps switch to low beam. If the dimmer circuit is properly calibrated the pointer of meter 11 should read within the proper dim sensitivity line. If the desired meter reading is not obtained, the phototube sensitivity control provided on the dimmer device (not shown) is adjusted accordingly and the test repeated.

The dimmer circuit is adjusted for hold sensitivity after obtaining the proper dim adjustment. To do this, the switch 31 is put into hold position by throwing toggle 15 over to hold. The intensity rheostat knob 13 is then turned clockwise as far as it will go. The vehicle headlamps are in the low beam or dim condition at this point. The light intensity rheostat is then adjusted by turning control knob 13 counterclockwise to gradually decrease the intensity of the bulb 27 until the headlamps switch to high beam. If the dimmer is properly calibrated, the pointer of meter 11 should read within the desired hold sensitivity line. If such a meter reading is not obtained, the phototube hold sensitivity control provided on the dimmer device is adjusted accordingly, and the test repeated until the desired reading is obtained.

While the form of embodiment of the present invention as herein disclosed constitutes a preferred form, it is to be understood that other forms might be adopted as may come within the scope of the claims which follow.

What is claimed is:

1. A mounting and leveling apparatus in combination with an optical device having a source of light at one end thereof, a light outlet opening at the other end thereof, and a condensing lens spaced therebetween to project parallel light rays through said light outlet opening, said apparatus being provided for accurately locating said optical device on a light pickup unit containing a photosensitive element and comprising a frame secured to said device at the light outlet end thereof and shaped to fit around the unit, a plurality of locating projections provided on the inner surface of the upper portion of said frame for accurately locating the device in vertical and horizontal planes on the pickup unit, and means on the inner surface of said frame for resiliently clamping said frame on the unit in adjusted position with parallel rays from said light outlet opening projected into the unit.

2. A mounting and leveling apparatus in combination with an optical device having a source of light at one end thereof, a light outlet opening at the other end thereof, and a condensing lens spaced therebetween to project parallel light rays through said light outlet opening, said apparatus being provided for accurately locating said optical device on a light pickup unit containing a photosensitive element and comprising a frame formed integral with the device and shaped to fit around the unit, a plurality of locating projections provided on the inner surface of the upper portion of said frame for accurately locating the device in vertical and horizontal planes on the pickup unit, a level positioned on the upper surface of said frame for accurately aiming said pickup unit in a vertical plane, said level being tiltable on said frame and provided with a calibrated dial for controlling the degree of tilt in order to compensate for axial error in a vertical plane present in the unit, and resilient means on the inner surface of said frame for clamping the device on the pickup unit in adjusted position with the light therefrom projected into the unit.

3. A mounting and leveling apparatus in combination with an optical device having a source of light at one end thereof, a light outlet opening at the other end thereof, and a condensing lens spaced therebetween to project parallel light rays through said light outlet opening, said apparatus being provided for accurately locating said optical device on a light pickup unit containing a photosensitive element a frame integral with the device and comprising angularly therefrom, said frame being shaped to fit around the unit, a plurality of ribs having a locating notch on their lower edge provided on the inner surface of the upper portion of said frame for accurately locating the device in vertical and horizontal planes on the pickup unit, a level positioned on the upper surface of said frame for accurately aiming said pickup unit in a vertical plane, said level being tiltable on said frame and provided with a calibrated dial for controlling the degree of tilt in order to compensate for axial error in a vertical plane present in the unit, and spring steel fingers on the inner surface of said frame for clamping the device on the pickup unit in adjusted position with said light outlet opening clamped on the pick-up face of the unit.

4. A testing and calibrating apparatus for use with a light pickup unit containing a photosensitive element comprising a housing having a bulb in one end and an opening in the other end in the side thereof, means for mounting said bulb for lateral and longitudinal adjustment comprising a stud projecting into said housing, a bulb-supporting arm adjustably clamped to said stud, said bulb being secured to said arm in offset position, a planar reflector provided in said housing to project the light rays through said opening, a condensing lens positioned in said housing adjacent said reflector, said lens being spaced from said bulb a distance substantially equal to the focal length of said lens thus enabling production of parallel light rays for projection through said opening, and means provided on said housing at the opening end thereof for accurately and removably clamping said housing on the front end of the pickup unit, said means generally conforming to the shape of the unit and formed to fit around the unit.

5. A testing and calibrating apparatus for use with a light pickup unit containing a photosensitive element comprising a housing having a bulb in one end and an opening in the other end, means for mounting said bulb for lateral and longitudinal adjustment in said housing, a lens positioned in said housing adjacent said opening, said lens being spaced from said bulb a distance substantially equal to the focal length of said lens thus enabling production of parallel light rays for projection through said opening, means on said housing at the opening end thereof for accurately mounting said housing on the front end of the pickup unit, said means extending in front of said opening at an angle to said housing and comprising a frame formed to fit around the pickup unit, a plurality of locating projections on the inner surface of the upper portion of said frame for accurately locating said housing in vertical and horizontal planes on the pickup unit, and resilient means on said frame for clamping said housing on the unit in adjusted position.

6. A testing and calibrating apparatus for use with a light pickup unit containing a photosensitive element comprising a housing having a bulb in one end and an opening in the other end, means for mounting said bulb for lateral and longitudinal adjustment comprising a stud projecting into said housing, a bulb-supporting arm adjustably clamped to said stud, said bulb being secured to said arm in offset position, a reflector provided in said housing to project the light rays through said opening, a condensing lens positioned in said housing adjacent said reflector, said lens being spaced from said bulb a distance substantially equal to the focal length of said lens thus enabling production of parallel light rays for projection through said opening said reflector being directly in line with the light rays from said bulb and substantially all the light rays incident thereupon being projected through the opening, means on said housing at the opening end thereof for accurately mounting said housing on the front end of the pickup unit, said means extending in front of said opening at an angle to said housing and comprising a frame formed to fit around the pickup unit, a plurality of projections on the inner surface of the upper portion of said frame for accurately locating said housing in vertical and horizontal planes on the pickup unit, a level positioned on the upper surface of said frame for accurately aiming said pick-up unit in a vertical plane, said level being tiltable on said frame and provided with a calibrated dial for controlling the degree of tilt in order to compensate for axial error in a vertical plane present in the unit, and spring steel fingers on the inner surface of said frame for clamping said housing on the unit in adjusted position.

7. A testing and calibrating apparatus for use with a light pickup unit containing a photosensitive element comprising a housing having a bulb in one end and an opening in the side wall at the other end, means for mounting said bulb for lateral and longitudinal adjustment comprising a stud projecting into said housing, a bulb-supporting arm adjustably clamped to said stud, said bulb being secured to said arm in offset position, a reflecting prism provided in said housing to project the light rays through said opening, a condensing lens positioned in said housing between said bulb and said prism, said lens being spaced from said bulb a distance substantially equal to the focal length of said lens thus enabling production of parallel light rays, substantially all the light rays emanating from said lens being reflected directly through the opening, a filter positioned in front of said bulb, means integral with said housing at the opening end thereof for accurately mounting said housing on the front end of the pickup unit, said means extending in front of said opening at an angle to said housing and comprising a frame formed to fit around the pickup unit, a plurality of ribs having locating means on their lower edge provided on the inner surface of the upper portion of said frame for accurately locating said housing in vertical and horizontal planes on the pickup unit, means on said frame for resiliently clamping said housing on the unit in adjusted position, a pair of cables connecting said bulb with a source of variable electrical energy, a meter in parallel circuit with said bulb for indicating the light intensity thereof, and a selector switch and two variable resistors in said parallel circuit, said switch serving to selectively place only one resistor in the parallel electrical circuit and in series with said meter.

8. A testing and calibrating apparatus for use with an automotive headlamp dimmer actuated by a light pickup unit containing a photosensitive element comprising a housing having a bulb in one end and an opening in the side wall at the other end, means for mounting said bulb for lateral and longitudinal adjustment comprising a stud projecting into said housing, a bulb-supporting arm adjustably clamped to said stud, the longitudinal axis of said arm being generally coextensive with that of said housing, said bulb being secured to said arm in offset position with its axis transverse to the axis of said arm, a reflecting prism provided in said housing to project the light rays through said opening, a condensing lens positioned in said housing adjacent said prism, said lens being spaced from said bulb a distance substantially equal to the focal length of said lens thus enabling production of parallel light rays, said reflecting prism being directly in line with the light rays from said bulb and substantially all the light rays incident thereupon being projected through the opening, a filter positioned in front of said bulb, means integral with said housing at the opening end thereof for accurately mounting said housing on the front end of the pickup unit, said means extending in front of said opening at an angle to said housing and comprising a frame formed to fit around the pickup unit, a plurality of ribs having a locating notch on their lower edge provided on the inner surface of the upper portion of said frame for accurately locating said housing in vertical and horizontal planes on the pickup unit, a level positioned on the upper surface of said frame for accurately aiming said pickup unit in a vertical plane, said level being tiltable on said frame and being provided with a calibrated dial for controlling the degree of tilt in order to compensate for axial error present in the unit, resilient spring steel fingers on said frame for clamping said housing on the unit in adjusted position, a pair of cables connecting said bulb with a source of variable electrical energy, a meter in parallel circuit with said bulb for indicating the light intensity thereof, and a selector switch and two variable resistors in said parallel circuit, said switch serving to selectively place only one resistor in the parallel circuit and in series with said meter.

9. A testing and calibrating apparatus for use with an automotive headlamp dimmer actuated by a light pickup unit containing a photosensitive element comprising a housing having a bulb in one end and an opening in the side wall at the other end, means for mounting said bulb for lateral and longitudinal adjustment comprising a stud projecting laterally into said housing, a bulb-supporting arm of circular cross section adjustably clamped in a receiving bore in said stud, the longitudinal axis of said arm being generally coextensive with that of said housing, said bulb being secured on said arm in offset position with its axis transverse to the axis of said arm, a reflecting prism provided in said housing to project the light rays through said opening, a condensing lens positioned in said housing between said bulb and said prism, said lens being spaced from said bulb a distance substantially equal to the focal length of said lens thus enabling production of parallel light rays, substantially all the light rays emanating from said lens being reflected directly through the opening, a neutral filter positioned in front of said bulb, means integral with said housing at the opening end thereof for accurately mounting said housing on the front end of the pickup unit, said means extending in front of said opening at an angle to said housing and comprising a frame formed to fit around and conform generally to the shape of the pickup unit and having a head portion formed at its front end about said opening, a plurality of ribs having a locating notch on their lower edge provided on the inner surface of the upper portion of said frame for accurately locating said housing in vertical and horizontal planes on the pickup unit, a level positioned on the upper surface of said frame for accurately aiming said pickup unit in a vertical plane, said level being tiltable on said frame and being provided with a calibrated dial for controlling the degree of tilt in order to compensate for axial error present in the unit, cam-operated spring steel fingers on the bottom and back end of said frame for resiliently clamping said housing on the unit in adjusted position, a pair of cables connecting said bulb with a source of variable electrical energy, a meter in parallel circuit with said bulb for indicating the light intensity thereof, and a selector switch and two variable resistors in said parallel circuit, said switch serving to selectively place only one resistor in the parallel circuit and in series with said meter.

References Cited in the file of this patent

UNITED STATES PATENTS

| | | |
|---|---|---|
| 1,673,325 | Godley | June 12, 1928 |
| 1,679,577 | Lollis | Aug. 7, 1928 |
| 1,701,626 | McCarthy | Feb. 12, 1929 |
| 1,739,650 | Ricker | Dec. 17, 1929 |
| 1,852,222 | Stead | Apr. 5, 1932 |
| 2,003,797 | Arbuckle | June 4, 1935 |
| 2,080,844 | Wittig | May 18, 1937 |
| 2,179,048 | Miller | Nov. 7, 1939 |
| 2,263,938 | West | Nov. 25, 1941 |
| 2,310,031 | Lowkrantz | Feb. 2, 1943 |
| 2,312,261 | Mills | Feb. 23, 1943 |
| 2,389,991 | Mayle | Nov. 27, 1945 |
| 2,404,476 | Early | July 23, 1946 |
| 2,451,501 | Liben | Oct. 19, 1948 |
| 2,481,988 | Early | Sept. 13, 1949 |
| 2,632,358 | Ehat | Mar. 24, 1953 |
| 2,741,737 | Gage | Apr. 10, 1956 |